US007976057B2

(12) United States Patent
Evans et al.

(10) Patent No.: US 7,976,057 B2
(45) Date of Patent: Jul. 12, 2011

(54) AUTOMOTIVE MILLED PSIR SCORING WITH INTERLACED INTERFACES

(75) Inventors: Gregg S. Evans, Windsor (CA); Andrew L. Dargavell, Oxford, MI (US)

(73) Assignee: Intertec Systems, LLC, Plymouth, MI (US)

( * ) Notice: Subject to any disclaimer, the term of this patent is extended or adjusted under 35 U.S.C. 154(b) by 0 days.

(21) Appl. No.: 12/703,231

(22) Filed: Feb. 10, 2010

(65) Prior Publication Data
US 2010/0237593 A1    Sep. 23, 2010

Related U.S. Application Data (60) Provisional application No. 61/150,916, filed on Feb. 9, 2009.

(51) Int. Cl.
*B60R 21/16*    (2006.01)
(52) U.S. Cl. .................................... 280/728.3
(58) Field of Classification Search ............ 280/728.3, 280/732
See application file for complete search history.

(56) References Cited

U.S. PATENT DOCUMENTS

| | | | | |
|---|---|---|---|---|
| 3,622,176 A * | 11/1971 | Byer | ......................... | 280/732 |
| 5,342,088 A * | 8/1994 | Bauer | ....................... | 280/728.3 |
| 5,431,435 A * | 7/1995 | Wilson | ....................... | 280/728.3 |
| 5,685,560 A * | 11/1997 | Sugiyama et al. | ............ | 280/731 |
| 6,106,003 A * | 8/2000 | Rahmstorf et al. | ........ | 280/728.3 |
| 6,199,897 B1 * | 3/2001 | Kreile | ........................ | 280/728.3 |
| 6,224,090 B1 * | 5/2001 | Lutze et al. | ................ | 280/728.3 |
| 6,357,792 B1 * | 3/2002 | Shirk et al. | ..................... | 280/737 |
| 6,379,604 B1 | 4/2002 | Evans et al. | | |
| 6,533,314 B2 * | 3/2003 | Merrifield et al. | ......... | 280/728.3 |
| 6,918,609 B1 * | 7/2005 | Friery et al. | ............... | 280/728.1 |
| 7,011,512 B2 | 3/2006 | Evans et al. | | |
| 7,014,209 B2 * | 3/2006 | Muller et al. | .............. | 280/728.3 |
| 7,497,463 B2 * | 3/2009 | Kaulbersch et al. | ....... | 280/728.3 |
| 7,594,674 B1 * | 9/2009 | Biondo et al. | .............. | 280/728.3 |
| 2002/0043144 A1 | 4/2002 | Reh et al. | | |
| 2004/0160043 A1 * | 8/2004 | Litjens et al. | ................ | 280/732 |
| 2007/0278773 A1 * | 12/2007 | Cowelchuck et al. | ........ | 280/732 |
| 2009/0026741 A1 * | 1/2009 | Grems et al. | ................ | 280/728.3 |
| 2009/0243264 A1 * | 10/2009 | Kaulbersch | ............... | 280/728.3 |
| 2009/0278337 A1 * | 11/2009 | Springer et al. | ........... | 280/728.3 |

* cited by examiner

*Primary Examiner* — Faye M. Fleming
(74) *Attorney, Agent, or Firm* — Dykema Gossett PLLC (57) ABSTRACT

An automotive Passenger Side Inflatable Restraint (PSIR) hidden door system contained in an automotive instrument panel and a method of scoring the PSIR door system. The system includes forward and rearward doors hingedly connected at first and second hinges, respectively, to a PSIR airbag chute. The system further includes a common tear line of reduced material thickness integrally joining the forward and rearward doors. The common tear line has a substantially non-linear shape with first and second linear ends.

21 Claims, 9 Drawing Sheets

AUTOMOTIVE MILLED PSIR SCORING WITH INTERLACED INTERFACES

CROSS-REFERENCE TO RELATED APPLICATION(S)

This application claims the benefit of provisional patent application U.S. Ser. No. 61/150,916, filed Feb. 9, 2009, which is expressly incorporated herein by reference.

BACKGROUND OF INVENTION a. Field of Invention

The invention relates generally to automotive instrument panels having automotive Passenger Side Inflatable Restraint (PSIR) components, and more particularly, the invention relates to a system and method for scoring an automotive milled PSIR door system to increase the bending strength of a common tear line to improve performance and long term aesthetics.

b. Description of Related Art

Automobiles are commonly equipped with airbags for reducing driver and passenger injuries in the case of an accident. Automobile airbags are generally located in areas where a driver or passenger would potentially contact an automobile interior in the event of an accident. Airbags can reduce injuries by providing a substantially non-solid surface for the driver or passenger to contact, as opposed to the generally solid surfaces of the automotive interior. Although the functionality of the airbag is greatly valued, the visual appeal of the instrument panel and invisibility of the airbag system are also of value to automobile manufacturers and consumers alike, as it leaves the general surface styling uninterrupted. Known airbag systems with seamless designs exist where there is virtually no indication on the outer surface of the instrument panel that the airbag is behind the instrument panel. Thus, any seams or tear lines provided in the instrument panel are only provided on the underside and not on the exposed side of the instrument panel.

Figure 1:
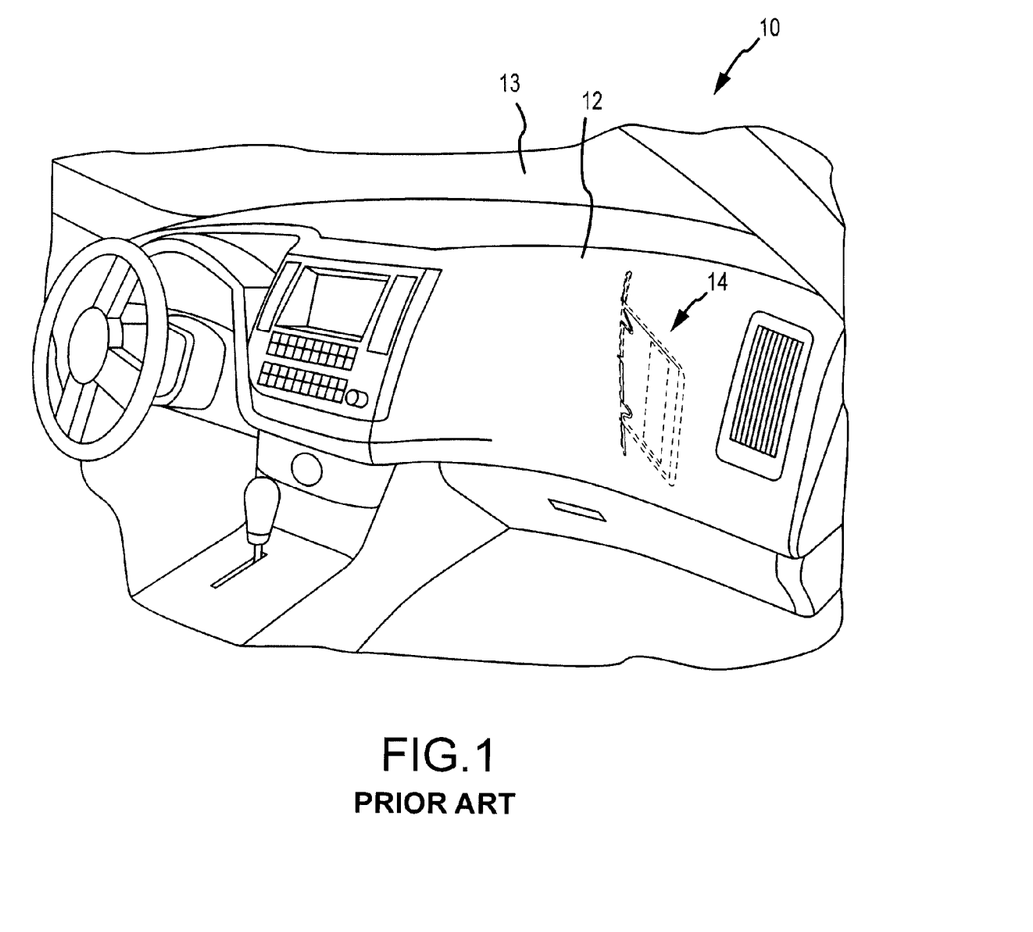
FIG. 1 is an environmental perspective view of an exemplary instrument panel containing a section view of a conventionally mounted Passenger Side Inflatable Restraint (PSIR) system.

In order to install an airbag, the airbag is generally folded into a module that is installed into and behind an automotive instrument panel component. The module housing a Passenger Side Inflatable Restraint (PSIR) is generally installed on the underside of an instrument panel, with a PSIR chute between the instrument panel and PSIR module. The instrument panel generally has pre-weakened lines, invisible when viewed from the top, forming one or two doors allowing the airbag to release therethrough. A PSIR chute is typically bonded to the instrument panel and generally includes PSIR doors that line up with the pre-weakened lines on the instrument panel. For example, FIG. 1 is an environmental perspective view of an automobile interior 10 having an exemplary instrument panel 12 and windshield 13, where instrument panel 12 contains on its underside a section view of a conventionally mounted PSIR system 14.

Figure 2:
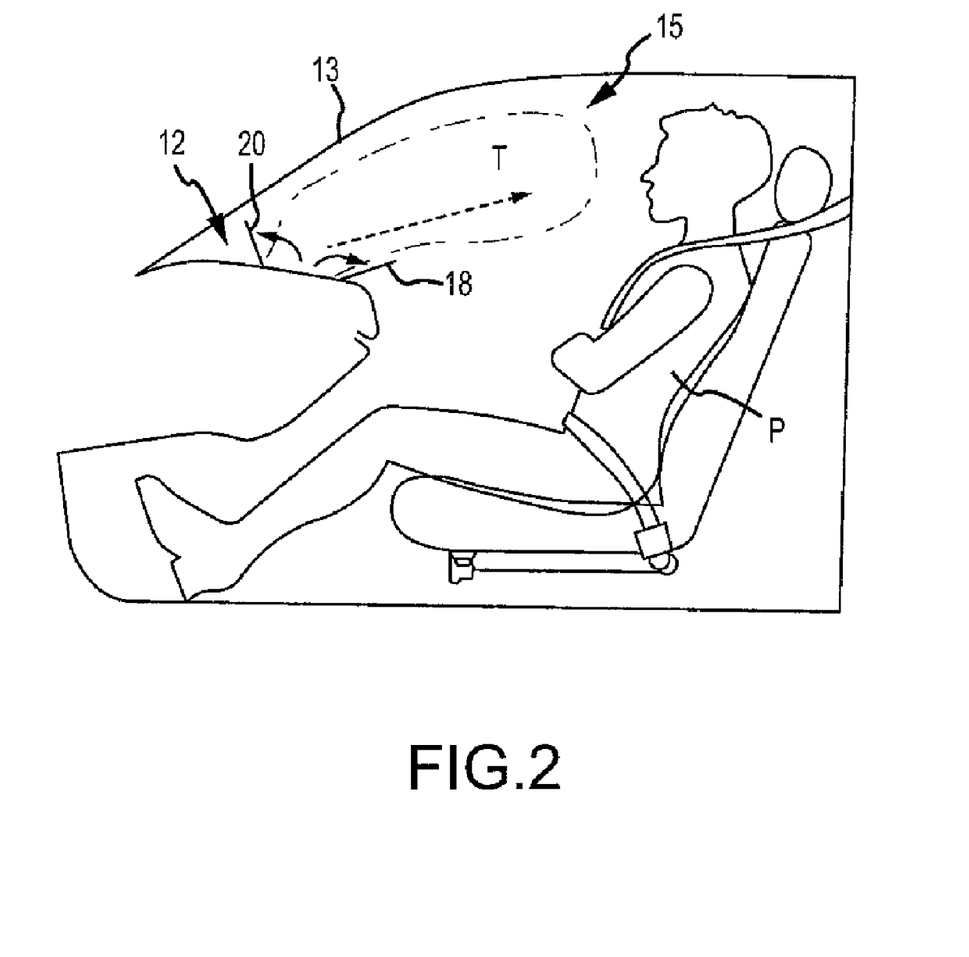
FIG. 2 is a diagram illustrating the deployment characteristics of a PSIR air bag.
Figure 3:
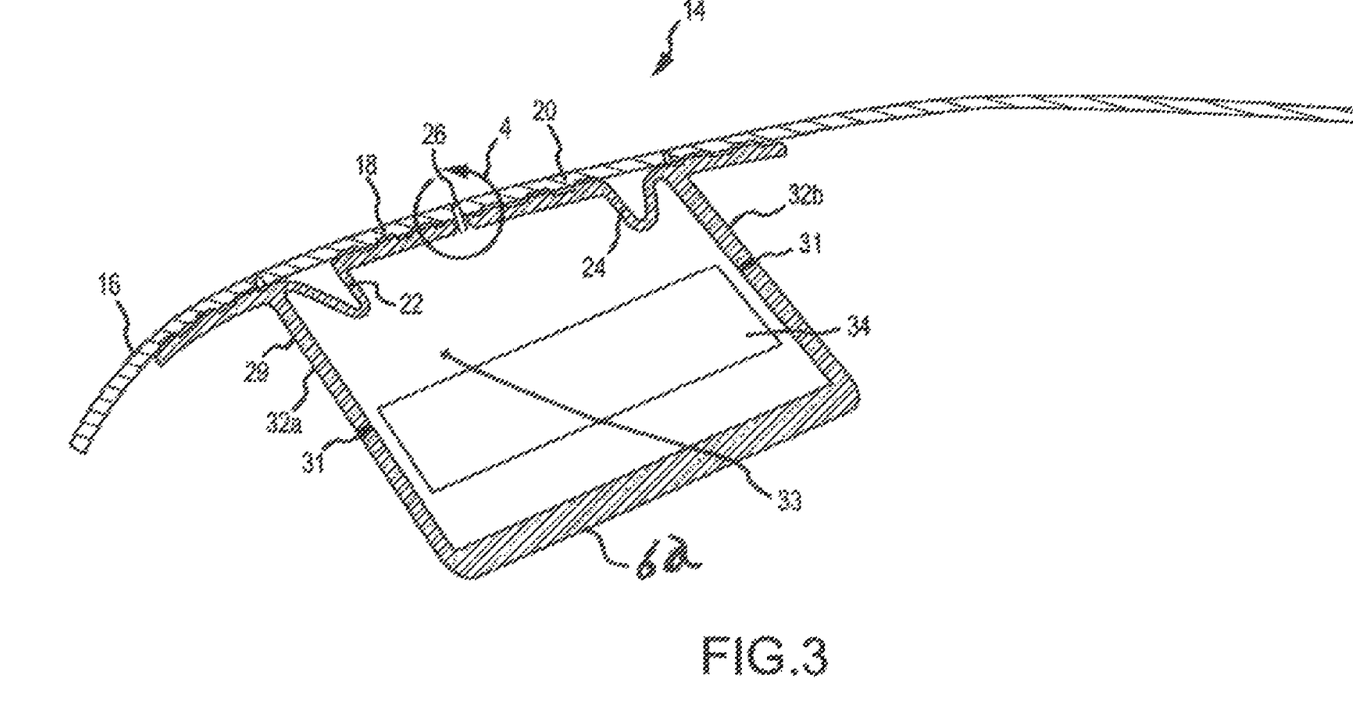
FIG. 3 is a fore-aft section view of a conventional PSIR system having an H-shaped pattern PSIR door system.
Figure 4:
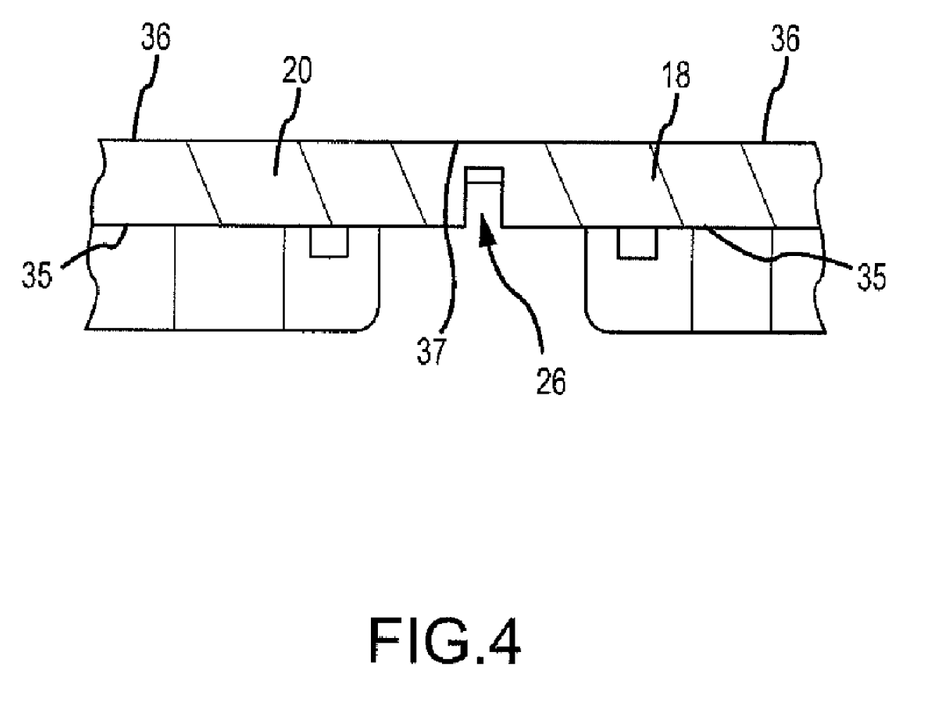
FIG. 4 is an enlarged view of the common tear line portion of FIG. 3 illustrating distortion in the area of the common tear line.
Figure 7:
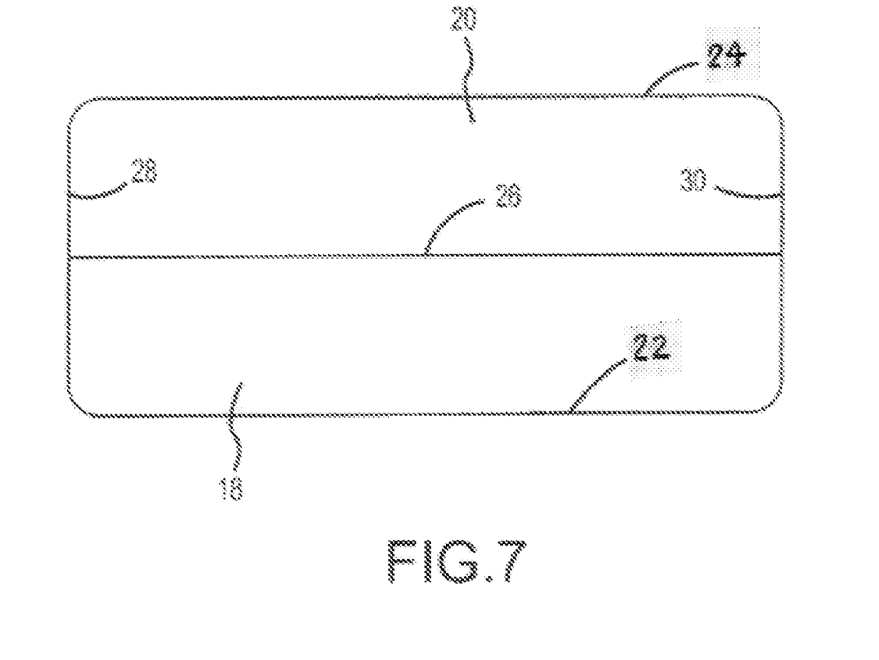
FIG. 7 is a top plan view of a conventional PSIR door design and deployment region where the common tear line is linear.

As is known in the art, instrument panel PSIR doors may generally include a U-shaped or H-shaped weakening pattern for facilitating adequate opening of the PSIR doors during air bag deployment, as well as for allowing deployment of the passenger air bag at an optimal trajectory. For example, FIG. 2 is a diagram illustrating exemplary deployment characteristics of a typical PSIR air bag. Referring to FIG. 2, a passenger P is positioned on the passenger side of an automobile interior in front of instrument panel 12 and windshield 13, and deployed airbag 15 must open at a substantially oblique trajectory T relative to forward PSIR door 20 and rearward PSIR door 18. FIG. 3 is a fore-aft sectional view of a conventional PSIR system having an H-shaped pattern PSIR door system. Referring to FIG. 3, a conventional H-shaped pattern automotive PSIR door system 14 is shown in cross section and generally includes rearward PSIR door 18 that can open toward passenger P (see FIG. 2) and forward PSIR door 20 that can open toward windshield 13 (see FIG. 2). PSIR doors 18, 20 may be formed from an instrument panel outer layer 16, and may be hingedly connected at hinges 22, 24, respectively, to chute 29. Chute 29 may include chute sidewalls 32a, 32b, and chute end wall 33 connected by connectors 31 to an airbag canister 62. PSIR doors 18, 20 are further coupled at common tear line 26, and may have side tear lines 28, 30 completing the H-shaped door pattern which opens during airbag deployment. The common tear line and side tear lines are weak areas of reduced thickness that are designed to tear and/or break when an airbag inflates and forces the PSIR doors open. An airbag 34 is contained within and coupled to chute 29 and is deployed through PSIR doors 18, 20 upon deployment. Common tear line 26 is typically a straight line or a linear design in conventional PSIR system door designs. For example, FIG. 7 is top plan view of a conventional PSIR door design and deployment region where the common tear line is a straight line. As shown in FIG. 7, a top plan view of a conventional PSIR system door design is shown, including rearward PSIR door 18 and forward PSIR door 20, hinges 22, 24, common tear line 26, and side tear lines 28, 30. In such conventional PSIR door designs, the common tear line 26, which is the only segment in the scoring pattern which is not supported by chute 29 (FIG. 3), can be easily bent. Such a common tear line can be formed by milling, cutting, grinding, or other known techniques. Typically, such a common tear line that is formed by milling and hidden from view can become bent or weakened due to various factors, including but not limited to, manufacturing stresses such as from the milling process itself, thermal effects, material shrinkage, physical attachments of the airbag to the PSIR door system, environmental loads such as temperature variations including extreme heat or cold, and passenger or occupant mistreatment such as a passenger or occupant putting his or her feet on or against the instrument panel, thereby putting pressure on and weakening the invisible common tear line. For example, FIG. 4 is an enlarged view of the common tear line portion of FIG. 3 illustrating distortion in the area of the common tear line. As shown in FIG. 4, a close-up of common tear line 26 is shown between PSIR doors 18, 20. The assembly method for chutes to hard instrument panels is typically vibration welding which produces melting of the plastic in both components where they contact, and which upon cooling, induces thermal shrinkage and stress in contact area 35 to cause compression in contact area 35 and tension in the opposite visible area 36 of the instrument panel outer layer 16. Further, the thermal shrinkage in contact area 35 can also cause bending in area 37 at common tear line 26.

Fragmentation or the launching of broken shards of plastic toward the occupant is to be avoided during deployment. The presence of bridge pieces 42 (see FIG. 5) produced during milling of the tear or score line, which act to increase the bending strength of score seams for aesthetic purposes, increases the tendency for such fragmentation. Thus, it is desirable to minimize or eliminate the number of bridge pieces that can potentially break off or fragment while still providing strength to the instrument panel and PSIR door system.

It would therefore be beneficial to provide an economical and efficient system and method for scoring an automotive milled PSIR door system that addresses the issues with existing systems and methods, and that minimizes and/or eliminates one or more of the above-identified deficiencies.

SUMMARY OF THE INVENTION

The invention overcomes the deficiencies of prior art PSIR door systems by providing a system and method for scoring an automotive milled PSIR door system, and in particular, for scoring a substantially non-linear common tear line or score line of the PSIR door system. The advantages of the invention are numerous and include, but are not limited to, increasing the bending strength of the common tear line by forming an interlaced interface between the PSIR doors, and minimizing or preventing the weakening, distortion, and/or bending of the common tear line. Another advantage and object of the invention includes greatly increasing the bending strength for invisibility while leaving the tensile strength weak for deployment performance of the airbag, and minimizing or eliminating the number of bridge pieces while still providing strength to the instrument panel and PSIR door system. Yet another advantage and object of the invention includes increasing the resistance and strength of the common tear line to manufacturing stresses, thermal effects, material shrinkage, physical attachments of the airbag to the PSIR door system, environmental loads, and passenger or occupant mistreatment, providing an economical and efficient system and method for facilitating optimal deployment of PSIR doors and the associated air bag, and providing a system and method that is beneficial to the overall PSIR door operation.

In an exemplary embodiment, the invention provides a method of scoring an automotive Passenger Side Inflatable Restraint (PSIR) hidden door system. The method includes the step of providing a PSIR door system having a forward door integrally joined to a rearward door via a common tear line, with the forward door and the rearward door being hingedly connected at a first hinge and a second hinge, respectively, to a PSIR airbag chute. The method further includes the step of providing a scoring device to score the common tear line joining the forward door and the rearward door. The method further includes the step of scoring the common tear line with the scoring device to form a region of reduced thickness having a substantially non-linear design with a first linear end and a second linear end, and welding the PSIR airbag chute.

For the method described above, in an exemplary embodiment, the PSIR door system may be an H-shaped pattern PSIR door system. In an embodiment, the scoring device may be a milling device. In an embodiment, the scoring step may form an interlaced interface between the forward door and the rearward door. The substantially non-linear design may be a substantially wavy line. In an exemplary embodiment, the first linear end and the second linear end may be straight line portions. The substantially non-linear design may provide increased strength in bending along the common tear line. In an embodiment, the welding may be vibration welding.

The invention further provides an automotive Passenger Side Inflatable Restraint (PSIR) hidden door system contained in an automotive instrument panel. The system includes a forward door and a rearward door hingedly connected at a first hinge and a second hinge, respectively, to a PSIR airbag chute. The system further includes a common tear line of reduced thickness integrally joining the forward door to the rearward door, with the common tear line having a substantially non-linear shape with a first linear end and a second linear end.

For the automotive PSIR hidden door system described above, in an embodiment, the forward door and the rearward door may form an interlaced interface along the common tear line. In another exemplary embodiment, the common tear line may be formed by milling. In an embodiment, the PSIR door system may be an H-shaped pattern PSIR door system. In another embodiment, the substantially non-linear shape may be a substantially wavy line. In an embodiment, the first linear end and the second linear end may be straight line portions. In another embodiment, the substantially non-linear design may provide increased strength in bending along the common tear line.

The invention further provides an automobile including an H-shaped pattern PSIR hidden door system including a forward door and a rearward door hingedly connected at a first hinge and a second hinge, respectively, to a PSIR airbag chute, and a common tear line of reduced thickness integrally joining the forward door to the rearward door. The common tear line may have a substantially non-linear shape with a first linear end and a second linear end.

For the automobile described above, in an embodiment, the forward door and the rearward door may form an interlaced interface along the common tear line. In another embodiment, the common tear line may be formed by milling. In an embodiment, the substantially non-linear design may provide increased strength in bending along the common tear line. In another embodiment, the substantially non-linear shape may be a substantially wavy line. In an embodiment, the first linear end and the second linear end may be straight line portions.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE PREFERRED EMBODIMENTS

Figure 8:
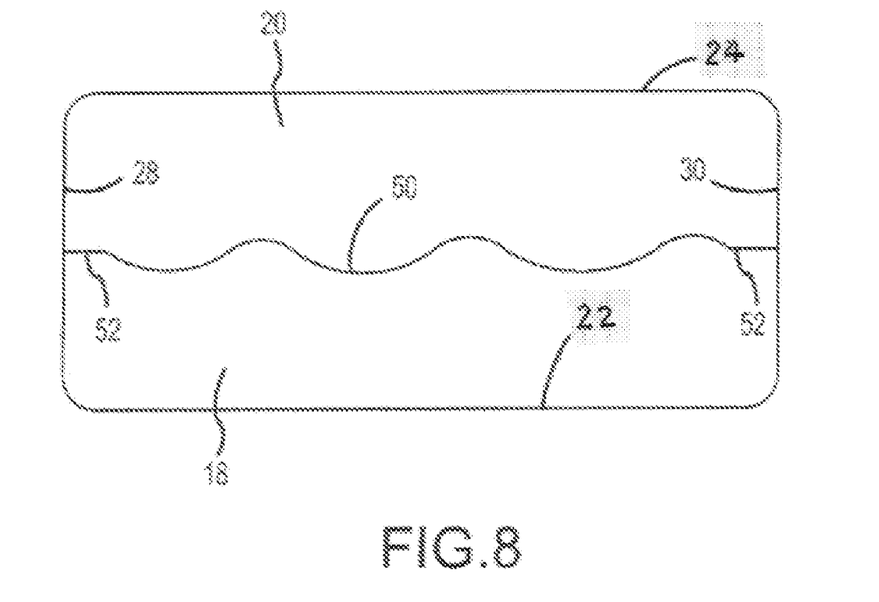
FIG. 8 is a top plan view of an embodiment of the disclosed invention for a PSIR door design and deployment region where the common tear line is substantially non-linear and the interface between the doors is interlaced.
Figure 9:
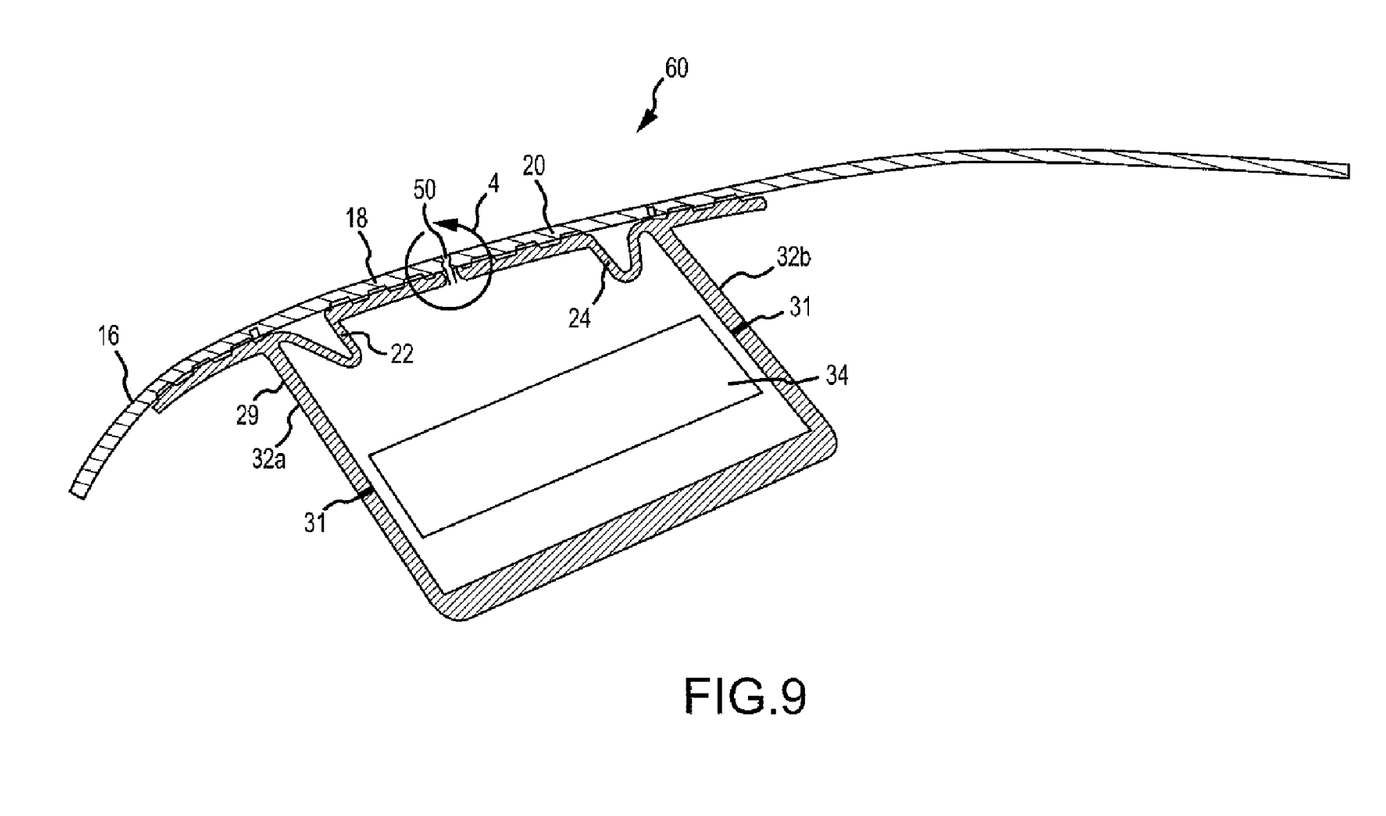
FIG. 9 is a fore-aft section view of one of the embodiments of the PSIR door system of the invention; and, FIG. 10 is a flow diagram of the steps of the method of the invention.

Referring now to the drawings wherein like reference numerals designate corresponding parts throughout the several views, as discussed above, FIGS. 1-4 and 8 are views illustrative of a related art PSIR door system. In particular, FIG. 7 shows a top plan view of a conventional PSIR door design and deployment region where common tear line 26 may be a linear design or straight line. FIG. 8 is a top plan view of an embodiment of the disclosed invention for an improved PSIR door design and deployment region where common tear line 50 may be a substantially non-linear design with linear end portions 52a, 52b. FIG. 8 shows the top plan view of the PSIR door system with rearward PSIR door 18 and forward PSIR door 20, hingedly connected at first rearward PSIR door hinge 22 and second forward PSIR door hinge 24, respectively, to PSIR airbag chute 29 (see FIG. 9). In one embodiment of the invention, as shown in FIG. 9, there is provided a fore-aft section view of an automotive Passenger Side Inflatable Restraint (PSIR) door system 60 contained in an automotive instrument panel 16. System 60 may include a rearward PSIR door 18 hingedly connected at first hinge 22 to chute sidewall 32a, and a forward PSIR door 20 hingedly connected at a second hinge 24 to chute sidewall 32b. System 60 may further include a common tear line 50 of reduced thickness integrally joining rearward PSIR door 18 to forward PSIR door 20. Common tear line 50 has a substantially non-linear shape with a first linear end 52a (see FIG. 8) and a second linear end 52b (see FIG. 8). PSIR doors 18, 20, of the system of the invention may be formed from instrument panel outer layer 16 (see FIG. 9). The instrument panel outer layer may be formed of a hard plastic material, such as thermoplastic polyolefin, blended polypropylene material, polycarbonate, polyethylene based polyolefin plastic, urethane, or another suitable plastic material. As shown in FIG. 9, PSIR doors 18, 20 may be hingedly connected at hinges 22, 24, respectively, to chute 29. Chute 29 may include chute sidewalls 32a, 32b, and chute end wall 33 connected by connectors 31, and chute sidewalls 32a, 32b and chute end wall 33 may contain and guide airbag 34.

The PSIR door system of the invention may include an H-shaped pattern PSIR door system and is similar in most aspects to the conventional PSIR door system shown in FIGS. 1, 3, and 7, except that linear common tear line 26 in the conventional PSIR door system of FIGS. 1, 3, and 7 is replaced with the substantially non-linear common tear line 50 with linear end portions 52a and 52b, as shown in FIG. 8. However, compared to the conventional automotive PSIR door system of FIG. 7, the PSIR door system of FIG. 8 includes several significant benefits. As shown in FIG. 8, rearward PSIR door 18 and forward PSIR door 20 may form an interlaced interface along common tear line 50. With the interlaced door design of the invention, the interlacing of PSIR doors 18, 20, where they join along substantially non-linear common tear line 50, increases the strength in bending along the common tear line. In addition, the substantially non-linear common tear line 50 greatly increases the bending strength for invisibility while leaving the tensile strength weak for deployment performance of the airbag. Moreover, the common tear line design of FIG. 8, minimizes or prevents the bending of the common tear line. The use of a non-linear common tear line 50 (see FIG. 8) with interlacing of the interface between the two doors 18 and 20 greatly increases the bending strength of common tear line 50, thus eliminating the need for potentially hazardous bridges, while having only the slightest effect on the energy required for the airbag to tear it in tension. The use of a non-linear interlaced common tear line between the two doors reduces the need for bridges while providing the increased bending strength necessary for aesthetic reasons. In addition, because common tear line 50 increases the strength in bending, and in turn, provides strength to the PSIR door system, the number of bridge pieces formed on the instrument panel can be minimized or eliminated, thus decreasing the possibility of the bridge pieces breaking off during deployment of the airbag, and thus decreasing the possibility of harm to a passenger or occupant. By eliminating or minimizing the bridge pieces, there is less chance of fragmentation of the bridge pieces when the airbag deploys. Moreover, the improved common tear line design increases the resistance and strength of the common tear line to manufacturing stresses, thermal effects, material shrinkage, stress due to physical attachments of the airbag to the PSIR door system, environmental loads, such as temperature variations including extreme heat or cold, and passenger or occupant mistreatment, such as a passenger or occupant putting his or her feet on or against the instrument panel, thereby putting pressure on and weakening the invisible common tear line. When the common tear line is bent, it is typically bent toward the cut or scored side. With a linear or straight common tear line, as shown in FIG. 7, when the common tear line is bent toward the cut or scored side, it gets weaker. However, with the substantially non-linear or substantially wavy line of FIG. 8, when environmental loads or other stresses are applied to the substantially non-linear common tear line, the substantially non-linear score line, because of its non-linear shape and design, is more difficult to bend and resists bending, and thus weakening of the common tear line is minimized in bending (the mode of visual failure) and maintained in tension (the mode of tearing as designed in a typical deployment). By interlacing the forward and rearward doors, that is, if an imaginary straight line is drawn through the substantially wavy line (FIG. 8), one door protrudes into the area of another door in an alternating pattern. If the interlacing interfaces are forced to bend, the more interlaced areas experience shear stress at a distance from the imaginary line, which is applied parallel or tangential to the interfaces, as opposed to a bending stress making it harder to bend.

The substantially non-linear design or shape of common tear line 50 may comprise a substantially wavy line (see FIG. 8). However, it is contemplated that common tear line 50 can be formed of other suitable non-linear designs and shapes. It is noted that sharp angles or sharply jagged lines are to be avoided to prevent or minimize the tendency to crack when the airbag deploys. Sharp corners are more likely to crack off and and/or cause harm to a passenger or occupant. First linear end 52a and second linear end 52b may include straight line portions (see FIG. 8). As shown in FIG. 8, first linear end 52a may form a substantially 90 degree angle with side tear line 28, and second linear end 52b may form a substantially 90 degree angle with side tear line 30. Linear ends 52a and 52b may be substantially straight and linear in design to avoid the formation of any sharp angles or jagged edges with side tear lines 28, 30, when the airbag deploys. Sharp edges are more likely to crack off and and/or cause harm to a passenger or occupant, especially during secondary collisions. The length of common tear line 50 depends on the type of airbag selected for the PSIR door system. In a particular embodiment, the common tear line may be about 180 millimeters in length to about 280 millimeters in length. However, other suitable lengths may also be used. The common tear line may be formed by milling. However, the common tear line may also be formed by cutting, grinding, ultrasonic scoring, injection molding, or another suitable technique.

In another embodiment the invention further provides an automobile including an H-shaped pattern PSIR door system, as discussed above, and shown in connection with FIGS. 8 and 9. The PSIR door system, as discussed above, may include forward and rearward doors hingedly connected at first hinge and second hinge, respectively, to airbag chute. The PSIR door system, as discussed above, further includes a common tear line of reduced material thickness integrally joining the forward door to the rearward door, with the common tear line having a substantially non-linear shape with a first linear end and a second linear end.

Figure 10:
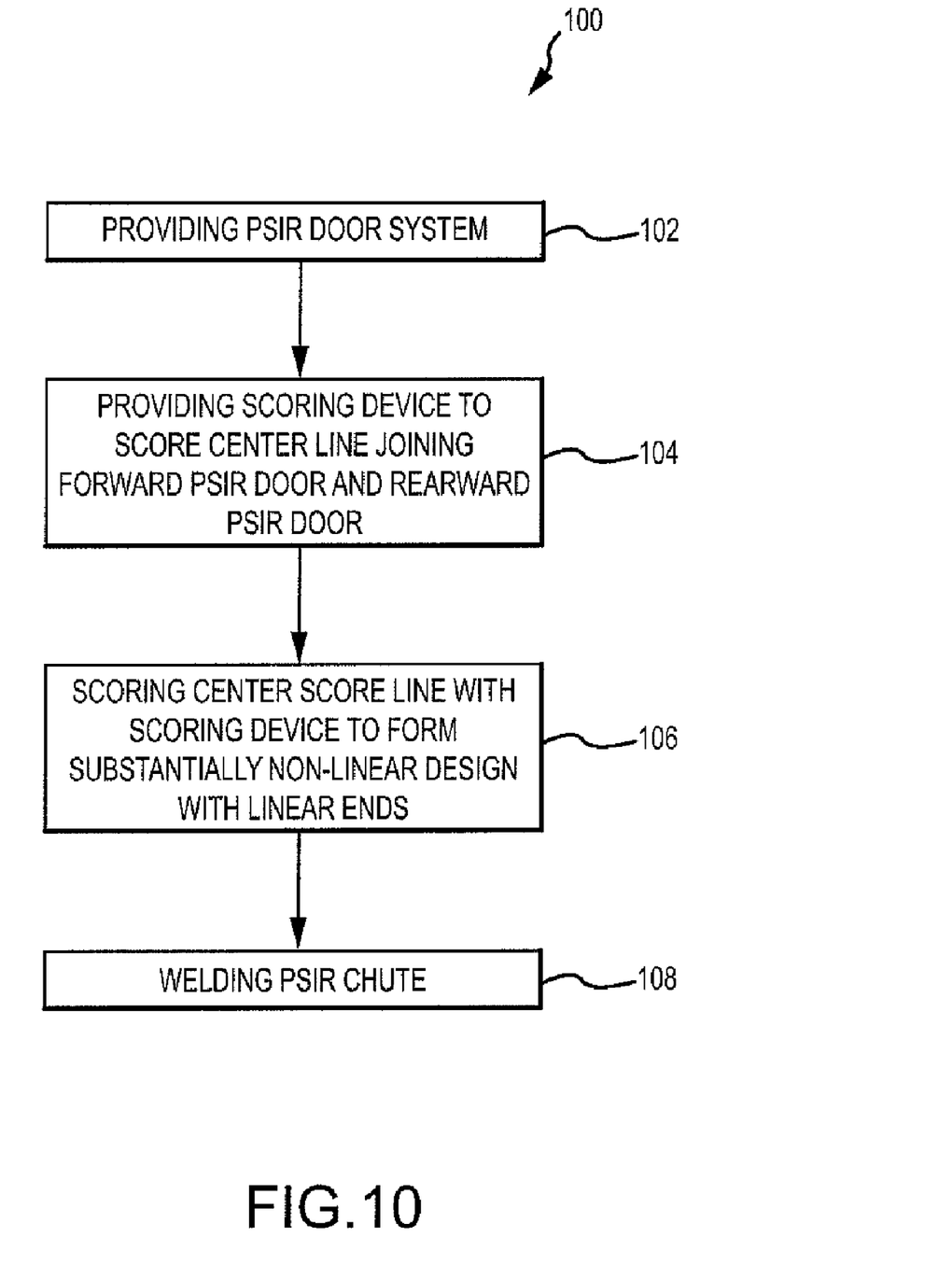

In another embodiment as shown in FIG. 10, the invention provides a method 100 of scoring an automotive PSIR door system. As shown in FIG. 10, method 100 may include step 102 of providing a PSIR door system, as discussed above and shown in FIGS. 8 and 9. The PSIR door system has the forward door integrally joined to the rearward door via the common tear line, as discussed above. The forward door and the rearward door may be hingedly connected at first hinge and second hinge, respectively, to a PSIR airbag chute, as discussed above. The PSIR door system may be an H-shaped pattern PSIR door system. Method 100 may further include step 104 of providing a scoring or cutting device (such as milling device 48 shown in FIG. 6) to score or cut the common tear line joining the forward door and the rearward door. The scoring or cutting device may include a milling device. However, the scoring or cutting device may also comprise a cutter, a grinder, an ultrasonic scoring device, an injection molding device, or another suitable scoring device. Method 100 may further include step 106 of scoring or cutting or forming the common tear line with the scoring device to form a region of reduced thickness having a substantially non-linear design with a first linear end and a second linear end. The scoring step may form an interlaced interface between the forward door and the rearward door. The substantially non-linear design may include a substantially wavy line. The first linear end and the second linear end may include straight line portions. The substantially non-linear design provides increased strength in bending along the common tear line. Method 100 may further include step 108 of welding the PSIR chute. The welding may include vibration welding or another suitable type of welding.

Figure 5:
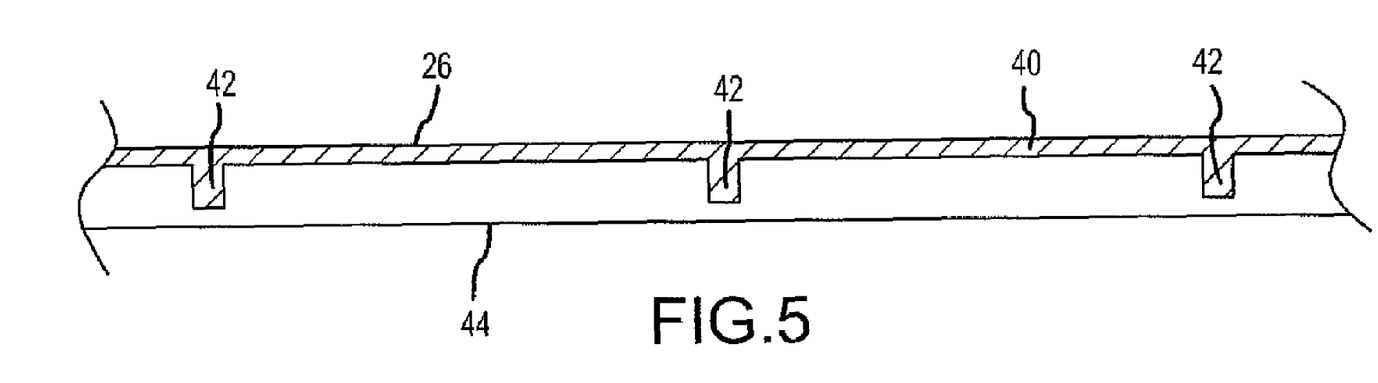
FIG. 5 is a cross-sectional view of an exemplary instrument panel cover obtained by milling.
Figure 6:
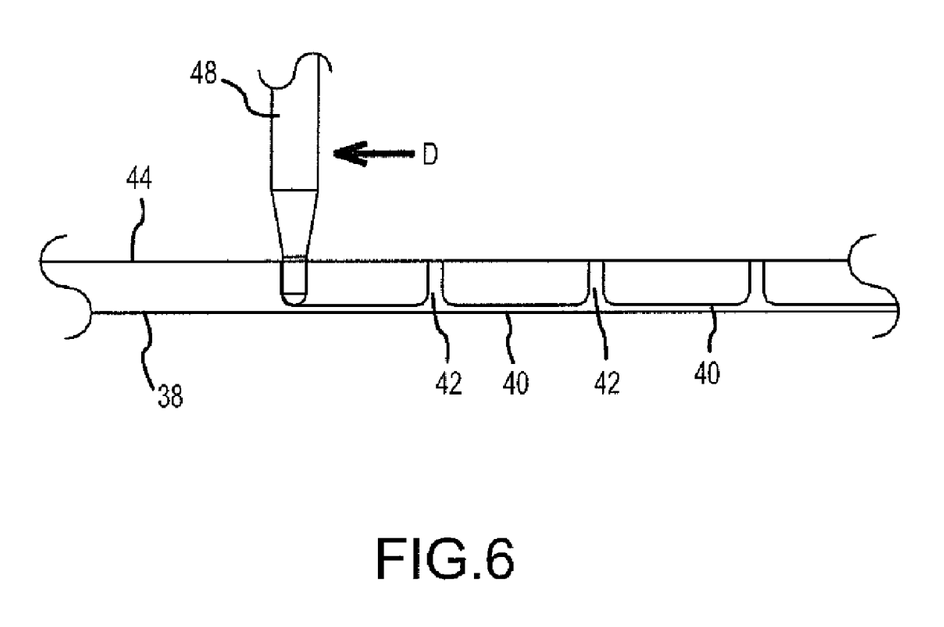
FIG. 6 is a cross-sectional view of an exemplary instrument panel cover and the milling device forming it.

FIG. 5 is a cross-sectional view of an exemplary instrument panel cover with a score line obtained by milling. As discussed above, in an embodiment, the instrument panel may be made of a thermoplastic material. FIG. 5 shows outer surface 38 (see FIG. 6) having thin portions 40 and bridge pieces 42 above inner surface 44. In an exemplary embodiment, the thin portions may be about 0.5 mm (millimeter) in width and the bridge pieces are about 1 mm (millimeter) in width. The bridge pieces are designed to add strength between the thin portions. FIG. 6 is a cross-sectional view of an exemplary instrument panel cover and exemplary milling device 48 which may be used to form the instrument panel cover. FIG. 6 shows the instrument panel cover in an upside down position as compared to the instrument panel cover shown in FIG. 5. When the instrument panel cover is to be milled, it is turned upside down and held, and the milling device or milling machine cuts out the selected portions. FIG. 6 shows milling device 48 moving in direction D to cut out and form thin portions 40 and bridge pieces 42 between outer surface 38 and inner surface 44.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A method of scoring an automotive Passenger Side Inflatable Restraint (PSIR) hidden door system for a vehicle having an instrument panel, the method comprising the steps of:
   providing a PSIR door system having a forward door formed from at least a portion of the instrument panel and a rearward door formed from at least a portion of the instrument panel, wherein the forward door is integrally joined to the rearward door via a common tear line, the forward and rearward doors being hingedly connected at first and second hinges, respectively, to a PSIR airbag chute;
   providing a scoring device to score the common tear line joining the forward and rearward doors;
   scoring the common tear line with the scoring device to form a region of reduced thickness having a substantially non-linear design with first and second linear ends; and
   welding the PSIR airbag chute.

2. A method according to claim 1, wherein the PSIR door system is a generally H-shaped pattern PSIR door system including first and second side tear lines, wherein the common tear line extends from the first side tear line to the second side tear line and wherein the first linear end of the common tear line meets the first side tear line and wherein the second linear end of the common tear line meets the second side tear line.

3. A method according to claim 1, wherein the scoring device is a milling device.

4. A method according to claim 1, wherein the scoring step forms an interlaced interface between the forward and rearward doors.

5. A method according to claim 1, wherein the substantially non-linear design is a substantially wavy line.

6. A method according to claim 1, wherein the first and second linear ends are straight line portions.

7. A method according to claim 1, wherein the substantially non-linear design provides increased strength in bending along the common tear line.

8. A method according to claim 1, wherein the welding is vibration welding.

9. An automotive Passenger Side Inflatable Restraint (PSIR) hidden door system contained in an automotive instrument panel comprising:
   forward and rearward doors formed from at least a portion of the instrument panel and hingedly connected at first and second hinges, respectively, to a PSIR airbag chute; and
   a common tear line of reduced thickness integrally joining the forward and rearward doors, the common tear line including a substantially non-linear shape with first and second linear ends.

10. A system according to claim 9, wherein the forward and rearward doors form an interlaced interface along the common tear line.

11. A system according to claim 9, wherein the common tear line is formed by milling.

12. A system according to claim 9, wherein the PSIR door system is a generally H-shaped pattern PSIR door system including first and second side tear lines, wherein the common tear line extends from the first side tear line to the second side tear line and wherein the first linear end of the common tear line meets the first side tear line and wherein the second linear end of the common tear line meets the second side tear line.

13. A system according to claim 9, wherein the substantially non-linear shape is a substantially wavy line.

14. A system according to claim 9, wherein the first and second linear ends are straight line portions.

15. A system according to claim 9, wherein the substantially non-linear design provides increased strength in bending along the common tear line.

16. An automobile having an instrument panel including a generally H-shaped pattern PSIR hidden door system comprising:
   forward and rearward doors formed from at least a portion of the instrument panel and hingedly connected at first and second hinges, respectively, to a PSIR airbag chute;
   a first side tear line of reduced thickness defining at least a portion of the forward and rearward doors;
   a second side tear line of reduced thickness defining at least a portion of the forward and rearward doors; and
   a common tear line of reduced thickness extending from the first side tear line to the second side tear line and integrally joining the forward and rearward doors, wherein the common tear line has a substantially non-linear shape with first and second linear ends and wherein the first linear end of the common tear line meets the first side tear line and wherein the second linear end of the common tear line meets the second side tear line.

17. An automobile according to claim 16, wherein the forward and rearward doors form an interlaced interface along the common tear line.

18. An automobile according to claim 16, wherein the common tear line is formed by milling.

19. An automobile according to claim 16, wherein the substantially non-linear design provides increased strength in bending along the common tear line.

20. An automobile according to claim 16, wherein the substantially non-linear shape is a substantially wavy line.

21. An automobile according to claim 16, wherein the first and second linear ends are generally straight line portions.

* * * * *